United States Patent [19]

Hashimoto et al.

[11] Patent Number: 4,717,121
[45] Date of Patent: Jan. 5, 1988

[54] DAMPER SYSTEM FOR AIR CONDITIONER

[75] Inventors: Yasuhiko Hashimoto; Kaneo Katayama, both of Shizuoka, Japan

[73] Assignee: Mitsubishi Denki Kabushiki Kaisha, Tokyo, Japan

[21] Appl. No.: 861,174

[22] Filed: May 9, 1986

[30] Foreign Application Priority Data

Jun. 5, 1985 [JP] Japan .................. 60-84787[U]
Jun. 5, 1985 [JP] Japan .................. 60-84788[U]

[51] Int. Cl.4 .................................. F16K 31/46
[52] U.S. Cl. .......................... 251/294; 251/228
[58] Field of Search ............... 74/501 R, 501 D; 251/228, 294, 298; 98/41.1

[56] References Cited

U.S. PATENT DOCUMENTS 2,866,472 12/1958 Risely ..................... 251/294 X
3,954,250 5/1976 Grace ..................... 251/294 X
3,986,363 10/1976 Beaman et al. ............. 74/501 D

FOREIGN PATENT DOCUMENTS 2557 of 1915 United Kingdom ........... 251/294

Primary Examiner—Harold Joyce
Attorney, Agent, or Firm—Sughrue, Mion, Zinn, Macpeak & Seas

[57] ABSTRACT

The end of a damper wire control cable 17 is provided with spaced anchor rings 33. During assembly a notched anchor plate 32 on a mounting bracket 24 or an anchor tab 35 on a cable clamp 21 is engaged in a groove 34 between the rings to firmly fix the cable end and prevent any longitudinal movement thereof, thus ensuring the full opening and closing of the damper. Some embodiments also enable the precise axial positioning or adjustment of the cable end during assembly.

3 Claims, 10 Drawing Figures

[4,717,121]

DAMPER SYSTEM FOR AIR CONDITIONER

BACKGROUND OF THE INVENTION

This invention relates to a damper system for adjusting the amount of air flow in an air conditioner.

A conventional air conditioner damper system is shown in FIGS. 7 to 10, wherein reference numeral 1 designates an air conditioner body comprising an indoor unit 3 and an outdoor unit 4 mounted on a base 2 with a predetermined interval therebetween and adapted to be inserted into a wall opening. A cabinet 5 of the indoor unit has a front face provided with a panel 8 having a suction inlet 6 and a blower outlet 7. A casing 9 forming an air flow path F is provided within the cabinet 5. A cooling unit/evaporator 10 for cooling the indoor air and a blower fan 11 driven by an electric motor (not shown) are provided within the casing 9. An outlet nozzle 12 is disposed in front of the fan. The remaining components such as the condenser, the compressor, etc. (not shown) are mounted within the outdoor unit 4 and are connected with each other and to the evaporator 10 by a refrigerant fluid piping arrangement (not shown).

The cabinet 5 and the casing 9 are provided with an air intake aperture 5a and a suction aperture 9a, respectively, and a damper system 13 is provided therebetween. The damper system has a tube-like duct 16 fixed to the cabinet 5 by screws 14, a damper 18 for opening/closing the air intake aperture 5a by the movement of a wire 17a of a damper cable 17 to thereby adjust the amount of air flowing in the duct 16, and a cable holder H. The duct body 15 has an outlet opening curved to accord with the shape of the casing, and a side portion provided with a shaft groove 20 having a slit 19. A cable support bracket 24 is integrally formed with the duct body 15, and has a rectangular hole 22 for receiving a pawl 21a of a cable clamp 21 described below, and a boss 23 for mounting the clamp by a screw 31.

The damper 18 has a flap or vane 25 inserted into the duct body 15 through the slit 19 to open or close the aperture 5a, and a pivot portion 26 rotatably supported in the groove 20 and integrally provided with a cable wire connection arm 27 to which the wire 17a of the cable 17 is connected. An L-shaped damper lever 28 (FIG. 8) is pivotally attached to a lever support 30 fixed to a plate 29 and has an operating knob inserted through the plate at one end. The other end is connected with the cable wire 17a.

In such a conventional air conditioner damper system the clamped end of the cable 17 pressed against the bracket 24 tends to work loose with repeated usage and over time, and when such end becomes movable in the longitudinal direction when the wire 17a is operated by the damper lever 28, it often becomes impossible to completely open or close the damper 18.

SUMMARY OF THE INVENTION

The present invention solves such problems of the prior art by providing a damper system for an air conditioner in which the end of the control wire cable is positively fixed at a desired position and cannot be moved longitudinally, whereby the damper can always be completely opened and closed. Thus, and in accordance with the invention, the end of the damper wire control cable is provided with spaced anchor rings. During assembly a notched anchor plate on the mounting bracket or an anchor tab on the cable clamp is engaged in a groove between the rings to firmly fix the cable end and prevent any longitudinal movement thereof, thus ensuring the full opening and closing of the damper. Some embodiments also enable the precise axial positioning or adjustment of the cable end during assembly.

DETAILED DESCRIPTION OF THE PREFERRED EMBODIMENTS

Figure 1:
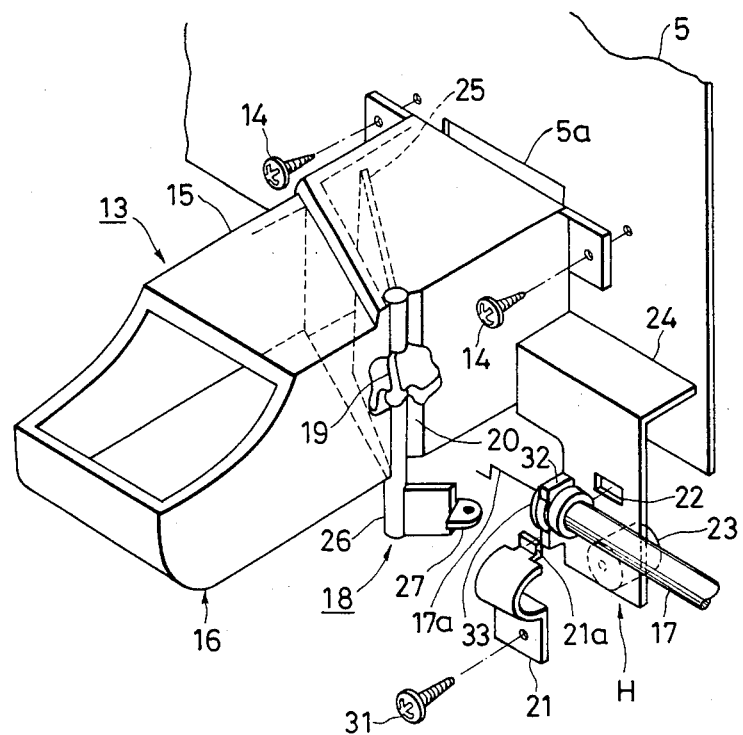
FIG. 1 is a perspective view of a first embodiment of an air conditioner damper system according to the invention.
Figure 2:
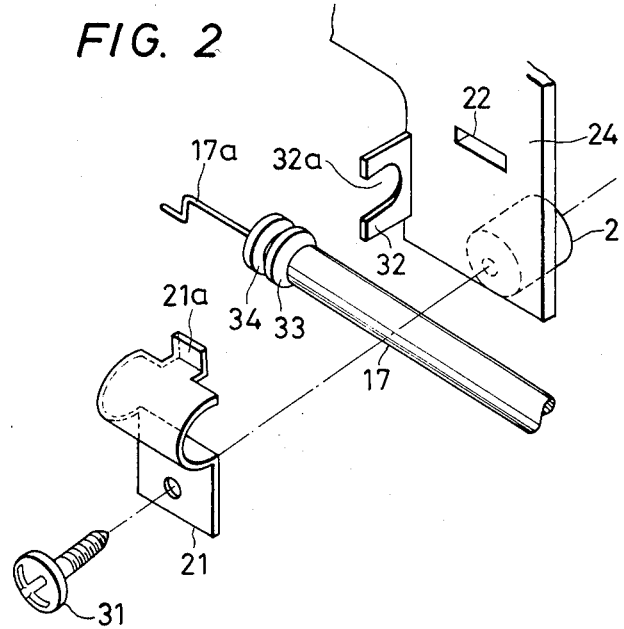
FIG. 2 is an exploded perspective view of the cable end clamping portion of FIG. 1.

FIGS. 1 and 2 show a first embodiment according to the present invention, wherein the same parts as those in FIGS. 7 to 10 are designated by the same reference numerals. In this embodiment an anchor plate 32 is integrally formed with the cable support bracket 24 and has a U-shaped notch 32a which seats in a groove 34 between adjacent anchor rings 33 integrally formed on the cable 17 at a predetermined position proximate the end thereof.

During assembly the end of the wire 17a is insertion coupled to the arm 27 of the damper 18 and the groove 34 is seated in the notch 32a, whereafter the clamp 21 is secured to the bracket 24 as described above to firmly anchor the end of the cable and positively preclude any longitudinal movement thereof.

Figure 3:
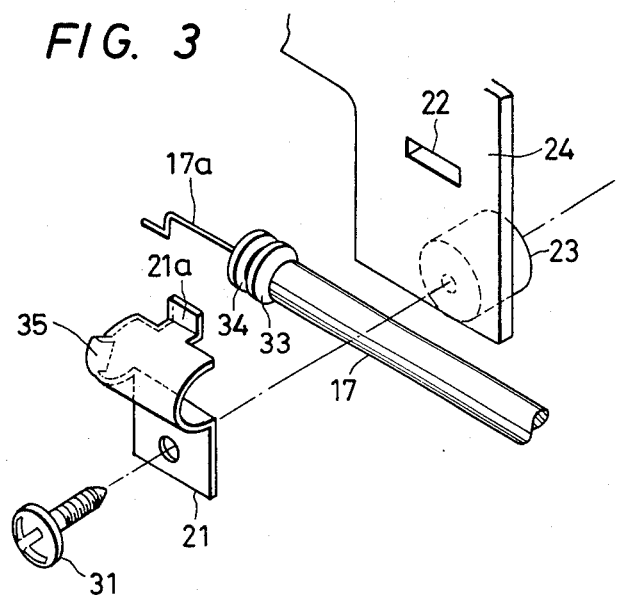
FIG. 3 is a similar exploded perspective view of a second embodiment of the invention.

FIG. 3 shows a second embodiment wherein an anchor tab 35 corresponding in function to the anchor plate 32 of the first embodiment is integral with and projects inwardly from the cable clamp 21. The tab 35 seats in the groove 34 between the anchor rings 33 of the cable 17 when the clamp 21 is mounted to the support bracket 24. The cable end anchoring effects of this embodiment are essentially the same as those of the first embodiment, but the molding of the duct body 15 is simplified by the elimination or "transfer" of the anchor plate 32.

Figure 4:
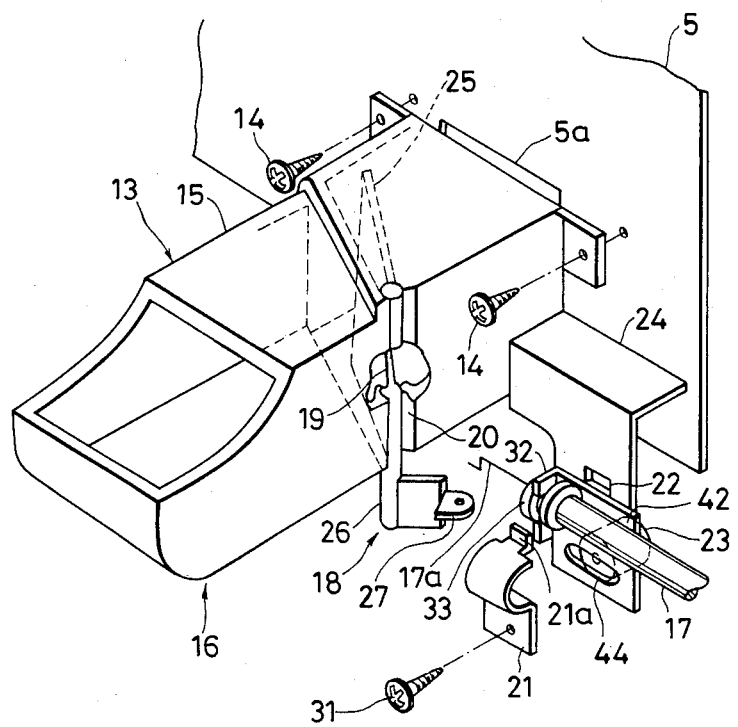
FIG. 4 is a perspective view of a third embodiment of the invention.
Figure 5:
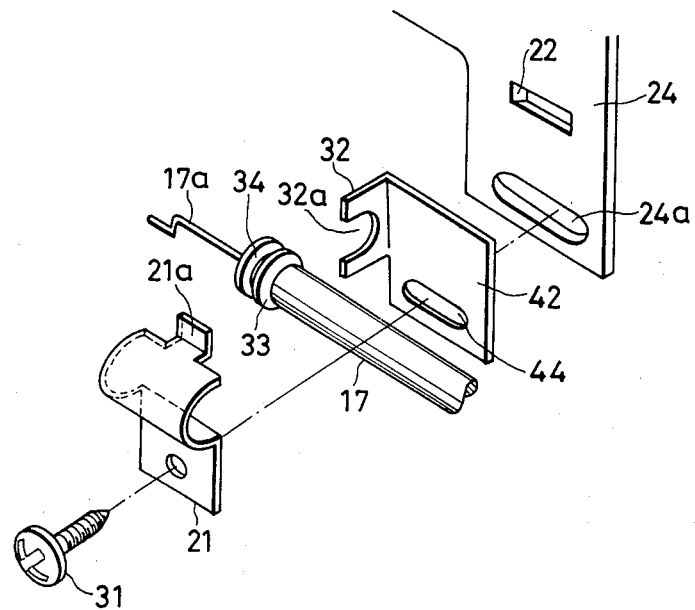
FIG. 5 is an exploded perspective view of a portion of FIG. 4.

FIGS. 4 and 5 show a third embodiment, wherein an elongated slot 24a is provided in the support bracket 24 and cooperates with a similar slot 44 in a cable positioning member 42 carrying a notched anchor plate 32 just as in the first embodiment. The slots 24a, 44 enable the longitudinal or axial position of the cable end to be appropriately set during assembly to ensure the full opening and closing of the damper 18, or the subsequent adjustment of the cable end to accommodate the stretching of the wire 17a after prolonged use. The screw 31 may be threaded directly into the slot 24a, or into a boss 23 behind the slot. The hole 22 in the bracket 24 for receiving the pawl 21a is also elongate in this embodiment to enable such longitudinal setting/adjustment.

Figure 6:
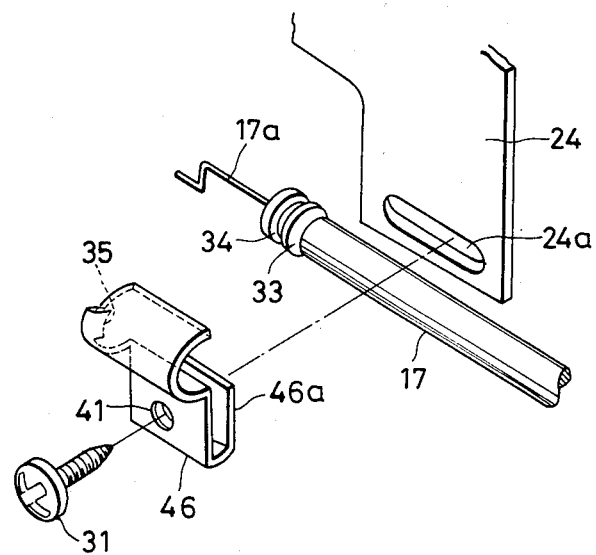
FIG. 6 is a similar exploded perspective view of a fourth embodiment of the invention.
Figure 7:
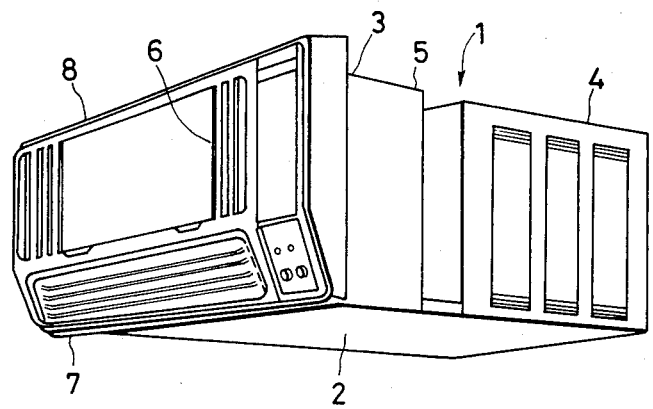
FIG. 7 is a perspective exterior view of a conventional air conditioner.
Figure 8:
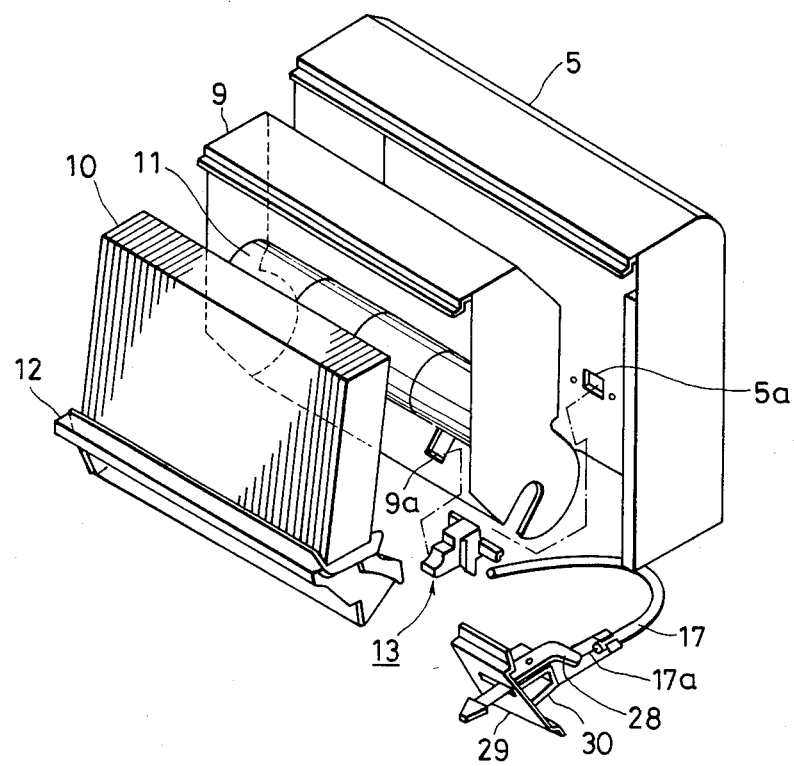
FIG. 8 is an exploded perspective view of an indoor unit of the air conditioner.
Figure 9:
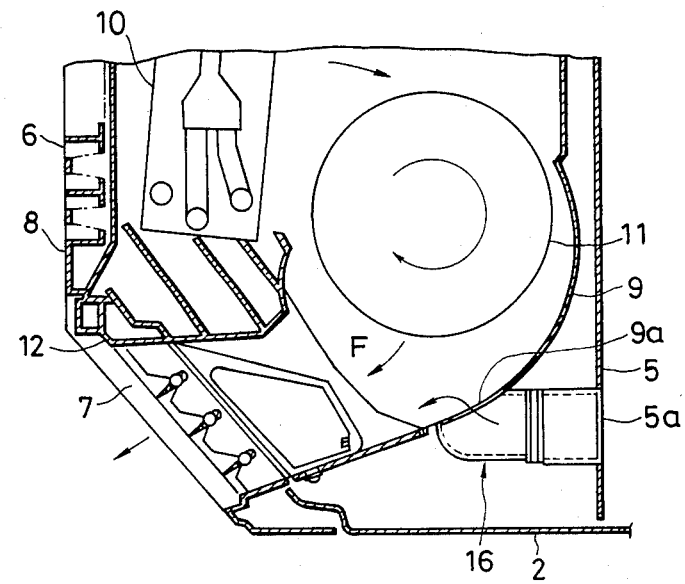
FIG. 9 is a sectional view of the indoor unit.
Figure 10:
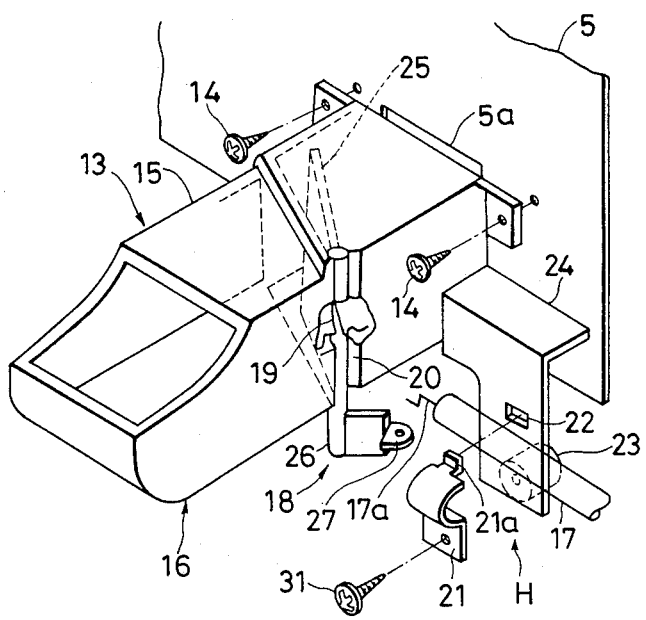
FIG. 10 is a perspective view of a conventional damper system.

FIG. 6 shows a fourth embodiment, wherein an anchor tab 35 is integrally formed on a cable clamp 46 as in the second embodiment, the pawl 21a and its hole 22 in the bracket 24 are eliminated, the bracket has an elongate slot 24a as in the third embodiment, and the clamp is U-shaped with a rear arm 46a. The clamp thus fits over the bottom of the bracket 24, and the screw 31 is threaded into a hole 41 in the rear arm 46a during assembly. This embodiment affords the same longitudinal setting and adjustment advantages as the third embodiment, and further benefits from an increased clamping force due to the elasticity of the U-shaped clamp.

What is claimed is:

1. A damper system for an air conditioner, comprising:
    (a) a duct (16) for connecting an outside air intake aperture (5a) to an air blower suction inlet (9a),
    (b) a pivotal damper (18) mounted in the duct for opening and closing the duct,
    (c) a control cable (17) for the damper including an outer sheath and a control wire (17a) slidably disposed within the sheath and having one end coupled to the damper,
    (d) first anchor means (33, 34) fixed to the sheath at one end thereof proximate said one end of the control wire,
    (e) a support bracket (24) integral with the duct,
    (f) a cable clamp (21) mountable to the support bracket for clamping said one end of the sheath therebetween,
    (g) second anchor means (32, 35) fixed to one of the support bracket and the cable clamp for engaging the first anchor means to prevent any longitudinal movement of said one end of the sheath when the clamp is mounted to the bracket, and wherein the first anchor means comprises a pair of spaced, outwardly extending rings (33) defining an annular groove (34) therebetween, and the second anchor means comprises a tab (35) integral with the clamp and seated in the groove.

2. A damper system according to claim 1, wherein the bracket has an elongate slot (24a) therethrough, and the clamp is adjustable in said slot during mounting to fix said one end of the sheath at a desired position.

3. A damper system for an air conditioner, comprising:
    (a) a duct (16) for connecting an outside air intake aperture (5a) to an air blower suction inlet (9a),
    (b) a pivotal damper (18) mounted in the duct for opening and closing the duct,
    (c) a control cable (17) for the damper including an outer sheath and a control wire (17a) slidably disposed within the sheath and having one end coupled to the damper,
    (d) first anchor means (33, 34) fixed to the sheath at one end thereof proximate said one end of the control wire,
    (e) a support bracket (24) integral with the duct,
    (f) a cable clamp (21) mountable to the support bracket for clamping said one end of the sheath therebetween,
    (g) second anchor means (32, 35) fixed to one of the support bracket and the cable clamp for engaging the first anchor means to prevent any longitudinal movement of said one end of the sheath when the clamp is mounted to the bracket, and wherein the first anchor means comprises a pair of spaced, outwardly extending rings (33) defining an annular groove (34) therebetween, wherein the bracket has an elongate slot (24a) therethrough, the second anchor means comprises a plate (32) integral with a cable positioning member (42) and having a U-shaped notch (32a) seated in the groove, the cable positioning member has an elongate slot (44) therethrough, and the cable positioning member is sandwiched between the clamp and the barcket to enable said one end of the sheath to be fixed at a desired longitudinal position.

* * * * *